United States Patent
Le et al.

(10) Patent No.: US 6,604,160 B1
(45) Date of Patent: Aug. 5, 2003

(54) COMPUTING SYSTEM ARBITRATING AND SELECTIVELY PROVIDING RESOURCE-SEEKING TASKS WITH TAKEAWAY OF NON-SHAREABLE RESOURCES

(75) Inventors: Cuong Minh Le, Tucson, AZ (US); Jerry Wayne Pence, Tucson, AZ (US); James Mitchell Ratliff, Benson, AZ (US)

(73) Assignee: International Business Machines Corporation, Armonk, NY (US)

( * ) Notice: Subject to any disclaimer, the term of this patent is extended or adjusted under 35 U.S.C. 154(b) by 468 days.

(21) Appl. No.: 09/671,971

(22) Filed: Sep. 28, 2000

(51) Int. Cl.[7] ............................................. G06F 13/38
(52) U.S. Cl. ................... 710/240; 710/200; 710/220; 710/241; 710/243; 710/244; 711/158
(58) Field of Search ..................... 710/200, 220, 710/240, 241, 243, 244, 122, 116; 711/158, 154, 129; 709/226; 714/44

(56) References Cited

U.S. PATENT DOCUMENTS

| | | | |
|---|---|---|---|
| 3,925,766 A | * 12/1975 | Bardotti et al. ............. 710/244 |
| 3,996,561 A | * 12/1976 | Kowal et al. ................. 710/43 |
| 4,096,569 A | *  6/1978 | Barlow ......................... 710/122 |
| 4,200,928 A |   4/1980 | Allan et al. .................. 364/200 |
| 4,609,995 A | *  9/1986 | Hasebe ......................... 710/244 |
| 4,638,424 A |   1/1987 | Beglin et al. ................. 364/200 |
| 4,771,375 A |   9/1988 | Beglin et al. ................. 364/200 |
| 4,876,662 A |  10/1989 | Pence .......................... 364/900 |
| 5,012,415 A |   4/1991 | Boe et al. ................. 364/424.07 |
| 5,150,466 A | *  9/1992 | Barlow et al. ............... 710/122 |
| 5,197,055 A |   3/1993 | Hartung et al. ............... 369/34 |
| 5,274,799 A |  12/1993 | Brant et al. ................. 395/575 |
| 5,278,970 A |   1/1994 | Pence .......................... 395/425 |
| 5,301,283 A | *  4/1994 | Thacker et al. ............. 710/116 |

(List continued on next page.)

OTHER PUBLICATIONS

U.S. Army Combat Systems Test Activity, "Information: Centralized Resource Scheduling", 1994, BMP, http://www.bmpcoe.org/bestpractices/internal/atcen_28.html.*

"Sort Process for Migration—Storage to Optical Versus Tape" IBM Technical Disclosure Bulletin, vol. 36 No. 10, Oct. 1993.

"Selectable Migration for Exporting Optical Media" IBM Technical Disclosure Bulletin, vol. 37 No. 06A, Jun. 1994.

"Recalling Migrated Data Sets" IBM Technical Disclosure Bulletin, vol. 26 No. 9, Feb. 1984.

"Automated Cartridge Disposition Promotion (Unload–Least Recently Used to KEEP)" IBM Technical Disclosure Bulletin, vol. 36 No. 08, Aug. 1993.

*Primary Examiner*—Gopal C. Ray
*Assistant Examiner*—Justin King
(74) *Attorney, Agent, or Firm*—Dan Hubert & Assoc.

(57) ABSTRACT

In a computing system with non-shareable resources, use-arbitrating processes are executed on behalf of each task seeking or having access to non-shareable resource. The processes compete according to prescribed rules and priority guidelines, the resolution of which determines access to the non-shareable resource. If application of the priority guidelines permits, a use-requesting task can institute takeaway of a resource from a task that is already using the resource.

30 Claims, 5 Drawing Sheets

U.S. PATENT DOCUMENTS

| | | | |
|---|---|---|---|
| 5,311,424 A | 5/1994 | Mukherjee et al. | 364/401 |
| 5,353,422 A | 10/1994 | Kobayashi et al. | 395/425 |
| 5,361,347 A * | 11/1994 | Glider et al. | 714/44 |
| 5,402,101 A | 3/1995 | Berger et al. | 340/286.02 |
| 5,418,971 A | 5/1995 | Carlson | 395/800 |
| 5,426,585 A | 6/1995 | Stepper et al. | 364/424.03 |
| 5,440,686 A | 8/1995 | Dahman et al. | 395/164 |
| 5,471,670 A * | 11/1995 | Hess et al. | 455/437 |
| 5,522,090 A | 5/1996 | Tanaka et al. | 395/894 |
| 5,546,557 A | 8/1996 | Allen et al. | 395/438 |
| 5,566,348 A | 10/1996 | Dahman et al. | 395/838 |
| 5,603,003 A | 2/1997 | Akizawa et al. | 395/441 |
| 5,613,082 A | 3/1997 | Brewer et al. | 395/404 |
| 5,646,918 A | 7/1997 | Dimitri et al. | 369/34 |
| 5,678,024 A * | 10/1997 | Wagar et al. | 711/129 |
| 5,740,061 A | 4/1998 | Dewey et al. | 364/478.02 |
| 5,826,043 A | 10/1998 | Smith et al. | 395/281 |
| 5,911,150 A | 6/1999 | Peterson et al. | 711/162 |
| 5,966,730 A | 10/1999 | Zulch | 711/162 |
| 5,970,147 A | 10/1999 | Davis | 380/25 |
| 5,980,078 A | 11/1999 | Krivoshein et al. | 364/131 |
| 5,995,960 A | 11/1999 | Lochner et al. | 707/3 |
| 5,999,930 A | 12/1999 | Wolff | 707/8 |
| 6,141,720 A * | 10/2000 | Jeffords et al. | 710/200 |
| 6,397,252 B1 * | 5/2002 | Sadiq | 709/226 |
| 6,499,090 B1 * | 12/2002 | Hill et al. | 711/158 |
| 6,510,478 B1 * | 1/2003 | Jeffords et al. | 710/200 |

* cited by examiner

COMPUTING SYSTEM ARBITRATING AND SELECTIVELY PROVIDING RESOURCE-SEEKING TASKS WITH TAKEAWAY OF NON-SHAREABLE RESOURCES

BACKGROUND OF THE INVENTION

1. Field of the Invention

The present invention relates to computing systems with different tasks that compete for access to non-shareable resources. More particularly, a computing system executes use-arbitrating processes on behalf of tasks seeking or having access to non-shareable computing resources, these processes competing according to prescribed rules and priority guidelines the resolution of which determines access to the non-shareable computing resources.

2. Description of the Related Art

In a multitasking computing environment, conflicts sometimes arise between different, competing tasks. In a data storage system, for example, one task may seek access to a non-shareable data storage medium that is already being used by another task. A specific instance of this condition occurs when one processing task requests access to a magnetic tape cartridge that has already been allocated, mounted to a tape drive, and undergone use by another task. In many systems today, the access-seeking task must wait until the preceding task's input/output activity completes and the tape cartridge is relinquished. The wait can be especially long when the earlier processing task involves a long running activity such as backing up data, which can take several hours to complete, especially with the high capacity storage of many tapes today.

Certain more advanced systems have been developed to allow later tasks to interrupt earlier tasks. Although some of these systems constitute a significant advance and may even enjoy widespread commercial success today, engineers at International Business Machines Corp. ("IBM") are continually seeking to improve the performance and efficiency of these interruption schemes. Some areas of possible focus concern expediting notice of successful interrupts, providing the ability to interrupt failed tasks, and improving the specificity with which such interrupts may be targeted.

SUMMARY OF THE INVENTION

Broadly, the present invention concerns a computing system that executes use-arbitrating processes on behalf of tasks seeking or having access to non-shareable computing resources, where these processes compete according to prescribed rules and priority guidelines, the resolution of which determines access to the non-shareable resources. The competing tasks may be external or internal to the computing system. One particularly advantageous application of this invention occurs in data storage systems, where the invention is implemented by a method of arbitrating access among multiple competing tasks to shared storage resources such as a magnetic tape cartridges ("tape"), or a magnetic tape drive and a tape mounted thereto ("drive/tape pair").

The use-arbitrating processes are performed by a storage manager, which is coupled to a number of other components such as an interface to customer applications, operator interface, tape drive controllers, automatic tape mount/demount equipment, and various data structures supporting conflict resolution. One of these data structures is a priority matrix identifying different types of resource-seeking tasks recognized by the data storage system. The priority matrix prescribes different conflict resolution solutions for potential conflicts that can occur between the different types of tasks. The data structures also include an in-use registry that identifies each tape that is in-use, along with the task "owning" that tape. The storage manager executes a separate process on behalf of each task having or seeking use of a tape.

For tasks seeking use of a tape, the storage manager performs a "use-initiation" procedure. In response to each task's request to use a particular tape ("targeted tape"), the storage manager begins the use-initiation operations on behalf of that task. First, the storage manager determines whether the targeted tape is already in-use by another one of the tasks. If not, the use-requesting application can begin using the targeted tape right away.

If the targeted tape is already in-use, however, the storage manager performs certain "preexisting use" operations. Namely, the storage manager consults the priority matrix to identify an appropriate conflict resolution solution. Then, if the identified conflict resolution solution allows the use-requesting task to obtain use of the targeted tape to the exclusion of the task that owns the tape, the storage manager submits a takeaway request and waits until the takeaway request is granted. At that time, the storage manager enters the identity of the use-requesting task into the in-use registry in conjunction with the targeted tape and advises the use-requesting task to commence use of the targeted tape. The use-requesting task therefore becomes the owning task.

When a task gains ownership of a tape, the storage manager performs "use/giveaway" operations on behalf of the task. First, the owning task begins use of the tape. Then, at convenient stopping points during the task's use of the tape, the storage manager determines whether a takeaway request is pending for the tape. If a takeaway request is pending, the storage manager consults the priority matrix to identify an appropriate conflict resolution solution. If the identified conflict resolution solution requires the owning task to surrender the tape, the storage manager advises the owning task to relinquish use of the tape, removes the owning task's identity from the in-use registry, and notifies the takeaway-requesting-task that the takeaway request has been granted.

The foregoing features may be implemented in a number of different ways. For example, the invention may be implemented to provide a method of operating a computing system to arbitrate and selectively provide resource seeking applications with takeaway of non-shareable resources. In another embodiment, the invention may be implemented to provide an apparatus such as a data storage system, or other computing environment configured to arbitrate and selectively provide resource seeking applications with takeaway of non-shareable resources. In still another embodiment, the invention may be implemented to provide a signal-bearing medium tangibly embodying a program of machine-readable instructions executable by a digital data processing apparatus to arbitrate access to computing resources as mentioned above. Another embodiment concerns logic circuitry having multiple interconnected electrically conductive elements configured to arbitrate access to computing resources as mentioned above.

The invention affords its users with a number of distinct advantages. For example, the invention prevents lengthy delays that are otherwise incurred when a use-seeking task waits until the natural conclusion of a preceding task's use of a non-shareable computing resource. This delay is now avoidable because the present invention selectively permits use-seeking tasks of higher priority to start using shared resources by "takeaway." Also, the present invention provides speedy notice of successful takeaway operations. In one embodiment, this notice occurs by the resource-owning task removing its entry from an in-use registry and the use-requesting task polling the in-use registry until the resource is available. In another embodiment, this notice occurs by a resource arbitrator affirmatively notifying the task requesting takeaway.

Additionally, the invention permits access-seeking tasks to perform takeaway operations even if the task owning the resource has failed. This feature is possible because the storage manager evaluates resource-owning tasks to identify any that have failed. If a resource-owning task has failed, the in-use registry can be changed by a neutral resource arbitrator or by a task seeking takeaway without participation of failed tasks. Another benefit of this invention is that, unlike prior approaches that pool interrupt requests, the invention logs each takeaway request in association with a specific resource being sought. This avoids the need for tasks to repeatedly submit, receive, and discard pooled interrupt requests until a specific resource is finally awarded. Still another benefit is that the invention allows many tasks to request takeaway from a single owner, and ensure takeaway priority is honored. The invention also provides a number of other advantages and benefits, which should be apparent from the following description of the invention.

DETAILED DESCRIPTION

The nature, objectives, and advantages of the invention will become more apparent to those skilled in the art after considering the following detailed description in connection with the accompanying drawings.

Hardware Components & Interconnections

The present invention may be implemented in a variety of different hardware environments. Chiefly, the invention is implemented in a computing environment that includes or has access to different resources that inherently cannot be shared, or resources that can be shared although sharing is undesirable. One example of a non-shareable resource includes serially-accessible data storage media, such as magnetic tape cartridges or tape reels. More specifically, magnetic tape data is laid down serially, and Read operations must rewind or advance the tape to a particular point where the data is located. Depending upon the particular style of data access, concurrent use of magnetic tapes is therefore inefficient, impractical, or even impossible.

In addition to magnetic tapes, the invention may also be implemented to arbitrate access to other types of computing resources. Some examples include serially-accessed optical media, direct-access storage such as circuit memory, communication equipment, tape drives, optical media drives, network resources, Internet access, files, data sets, database records, server resources, etc.

Data Storage System

Introduction

Although the invention may be implemented to arbitrate access among competing tasks to different types of resources, the following description of this invention is made in the specific context of magnetic tape cartridges, for ease and clarity of illustration. In this context, one aspect of the invention concerns a data storage system 100, which may be embodied by various hardware components and interconnections, with one example being described by the system 100 of FIG. 1. The data storage system 100 includes a subsystem facility 102 coupled to one or more applications 103–105, an operator interface 109, controllers 112, mount/demount equipment, and one or more magnetic tape drives 114–116.

Tape Related Hardware

Figure 1:
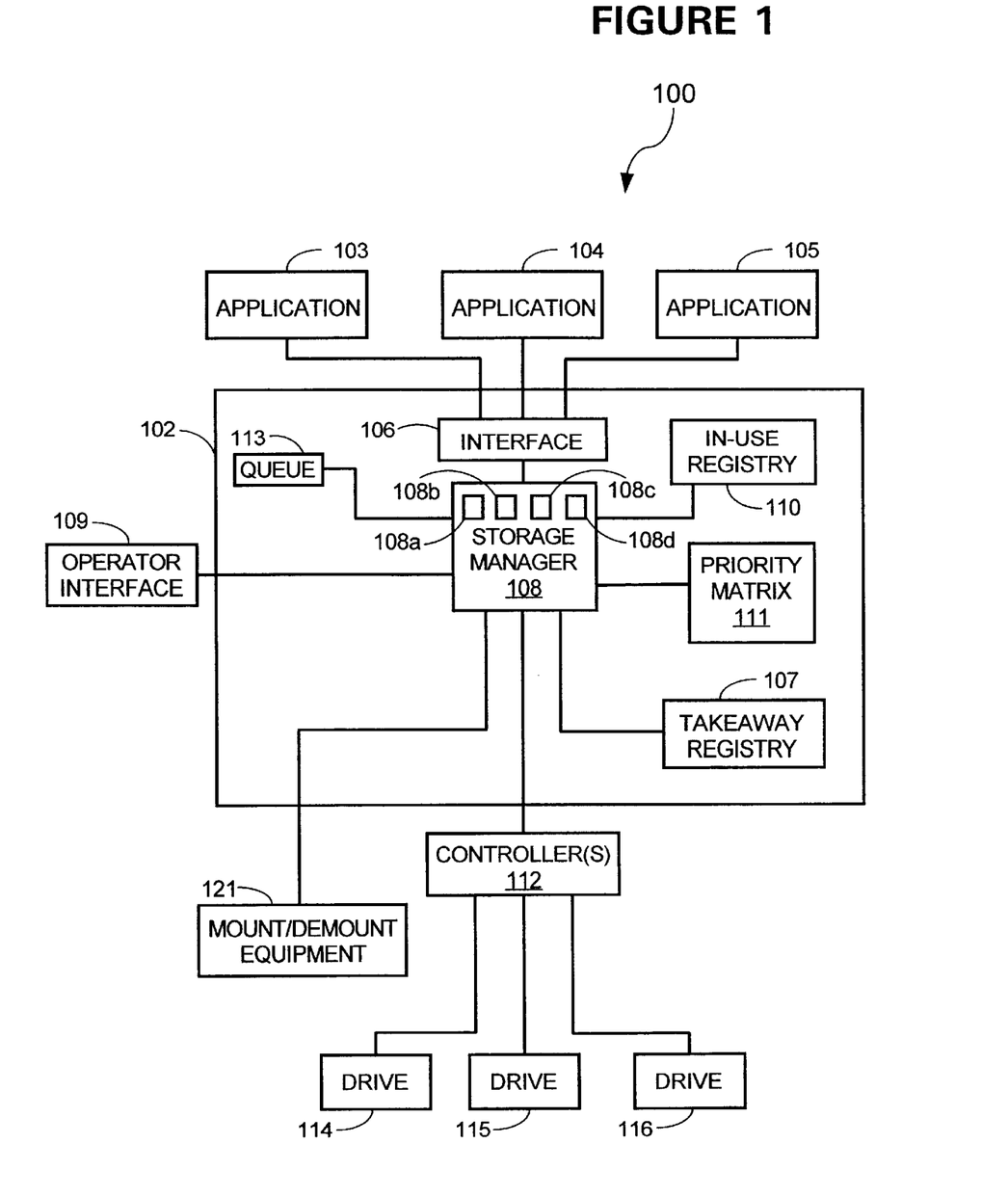
FIG. 1 is a block diagram of the hardware components and interconnections of a data storage system according to the invention.

The tape drives 114–116 may be implemented by various makes and models, one example being the IBM model 3590-E1A magnetic tape drive. In addition to tape storage, the system 100 may also include other, non-illustrated forms of storage, such as magnetic disk drive storage, volatile circuit memory such as cache, nonvolatile circuit memory, and the like.

The controllers 112 manage low level operations of the tape drives 114–116 under direction of the storage manager 108. For instance, the controllers 112 may direct read/write heads to carry out Read and Write operations upon tapes mounted to the drives 114–116. The controllers 112 may comprise one or more microcontrollers, for example.

The mount/demount equipment 121 serves to mount and demount tapes to/from the drives 114–116. In one example, such equipment may be provided by a separate cartridge loader or other equipment local to each drive. In another example, the equipment 121 may be provided by a robotic arm or other component with universally access to all drives 114–116. In still another, a human operator may perform tape mounting and demounting.

Applications

The applications 103–105 may comprise customer applications, host processing applications, or other processing applications seeking access to removable magnetic tape cartridges that constitute the non-shareable computing resources in this particular example. In contrast to other processes performed internally by the subsystem facility 102, the applications 103–105 are executed external to the subsystem facility 102. The applications 103–105 may comprise application software programs, computer workstations, servers, personal computers, mainframe computers, manually activated operator terminals, and/or other computing applications. In one example, the applications 103–105 represent customers' application programs that utilize magnetic tape media provided by the system 100.

As discussed in greater detail below, the present invention arbitrates tape use conflicts that occur in the system 100. Such conflicts may occur among competing applications 103–105, among internal processes 108a–108d (described below) of the subsystem facility 102, or between the two. These applications and processes are collectively referred to as "tasks."

Operator Interface

As mentioned above, the subsystem facility 102 is also coupled to an operator interface 109 including components such as a computer terminal, keyboard, video monitor, computer mouse, manual controls such as dials, buttons, switches, etc. The operator interface 109 permits a system administrator or other human operator to alter the operation of the subsystem facility 102 by entering commands, changing operating parameters, etc. The operator interface 109 may also permit application program to monitor and alter the operation of the subsystem facility 102 by entering commands, changing operating parameters, etc.

Subsystem Facility

The subsystem facility 102 is implemented by a computing facility with various hardware and software components. In the illustrated embodiment, these include a storage manager 108, an interface 106, an in-use registry 110, a priority matrix 111, a takeaway registry 107, and a queue 113. These components are implemented using a combination of hardware and software.

Storage Manager

The storage manager 108 is implemented by a software program, which may be run by a hardware device dedicated to this purpose (such as an IBM RS/6000 machine), or by a multi-purpose hardware device (such as an IBM S/390 machine) that is used for this and other purposes. Beyond these particular examples, the storage manager 108 may be implemented by software on a variety of different hardware devices, such as a personal computer, server, computer workstation, mainframe computer, etc. As a specific example, the storage manager 108 may be implemented by IBM model Data Facility Storage Management Subsystem Hierarchical Storage Manager (DFSMShsm) software running on a commercially available IBM model S/390 product.

Broadly, the storage manager 108 serves to manage the access of tapes on behalf of the applications 103–105 as well as various processes 108a–108d executed by the storage manager 108 itself. The applications 103–105 and processes 108a–108d are referred to as "tasks." The processes 108a–108d may comprise processing threads, subroutines, or other programs executed by the storage manager 108. The applications 103–105, for example, may require access to tapes to store data related to those applications. The processes 108a–108b, for example, may require access to tapes in order to carry out data management functions of the subsystem facility 102 such as data mirroring, data migration, data recall, data backup, data recovery, and other functions internal to the subsystem 102, which may even be transparent to the applications 103–105.

In its role as director of the subsystem facility 102, the storage manager 108 receives operator input from the interface 109, manages the controllers 112 to read and write data to tapes, and manages the mount/demount equipment 121 to load and unload tapes from the drives 114–116. Importantly, the storage manager 108 also coordinates use of the various data structures related to conflict resolution, including the in-use registry 110, priority matrix 111, takeaway registry 107, and queue 113. These data structures are utilized to help resolve tape use conflicts among competing tasks, comprised of the applications 103–105 and/or processes 108a–108d.

Interface

The interface 106 provides one or more communications links between the applications 103–105 and the storage manager 108. The interface 106 may utilize wires, busses, shared memory, backplanes, wireless links, intelligent communications channels, computer networks, or other communications links.

Data Structures Supporting Conflict Resolution

As mentioned above, the subsystem facility 102 includes a number of data structures to help resolve conflicts for use of the same tape. These data structures, which include the in-use registry 110, priority matrix 111, takeaway registry 107, and queue 113, may be implemented by one or more registers, matrices, linked lists, databases, look-up tables, or other suitable data structures. For ease of illustration, these data structures are shown as separate tables.

The in-use registry 110 identifies (1) each tape that is currently being used by a task, said to be "in-use" or "owned" by that respective task, (2) the task that has acquired ownership, and (3) the type of the owning task. According to the illustrated option, a tape may be omitted from the in-use registry if the tape is not in-use. Tapes may be identified by using volume serial number ("VOLSER") or other appropriate indicia. As for the owners, these may be listed by task name, process name, memory location, host-ID, or other suitable code. The type of task identifies one of several pre-recognized functions that describes the purpose of the task. In the present example, the pre-recognized functions include:

Dataset Recovery, in which a dataset is recovered from backup tape(s).

Backup, in which a backup copy of a file or volume is made onto tape.

Recycle Source Volumes, in which valid data sets are being copied to a recycle output volume in order to consolidate valid data on a tape.

Recycle Output Volumes, in which data sets are being copied from a recycle source volume in order to consolidate valid data on tape storage.

Tape Copy, in which one tape is copied into another tape. TABLE 1 (below) shows an exemplary in-use registry.

TABLE 1

EXEMPLARY IN-USE REGISTRY

| TAPE'S VOLUME SERIAL NUMBER (VOLSER) | TASK WITH EXCLUSIVE ACCESS ("OWNER") | TYPE OF OWNING TASK |
|---|---|---|
| 113846R87157AG | process 108a | backup |
| 11341RO123478 | process 108b | recycle source |
| ... | ... | ... |

The priority matrix 111 prescribes different conflict resolution solutions for potential conflicts that can occur between the different pre-recognized task types. The priority matrix 111 is illustrated in the form of a two-dimensional matrix for ease of discussion, and the term "matrix" is used for ease of reference without any intended limitation to data structures strictly arranged as "matrices." The conflict resolution solutions of the priority matrix 111 anticipate any conflicts between tasks of the pre-recognized types, listed above. As serval examples, the conflict resolution solutions may anticipate all possible types of tasks (even if some might not conflict), a limited subset of tasks likely to utilize the subsystem facility 102, only those tasks that present a potential conflict, or another subset.

TABLE 2 (below) shows an exemplary priority matrix 111. In this example, the only tasks listed in the priority matrix 111 are processes 108a–108d, internal to the storage manager 108. Furthermore, all such tasks are listed whether the various combinations would actually conflict or not. For ease of illustration, different types of applications 103–105 are not shown. The pre-recognized tasks of the illustrated priority matrix 111 include, as mentioned above, Dataset Recovery, Backup, Recycle Source Volumes, Recycle Output Volumes, and Tape Copy.

TABLE 2

PRIORITY MATRIX

| USE-SEEKING TASK | OWNING TASK | | | | |
|---|---|---|---|---|---|
| | DATA SET RECOVERY | BACKUP | RECYCLE SOURCE VOLUMES | RECYCLE OUTPUT VOLUMES | TAPE COPY |
| DATA SET RECOVERY | NO TAKEAWAY | IMMEDIATE TAKEAWAY | IMMEDIATE TAKEAWAY | IMMEDIATE TAKEAWAY | TAKEAWAY DELAYED |
| BACKUP | NO CONFLICT | NO CONFLICT | NO CONFLICT | NO CONFLICT | NO CONFLICT |
| RECYCLE SOURCE VOLUMES | NO TAKEAWAY | IMMEDIATE TAKEAWAY | NO CONFLICT | NO CONFLICT | TAKEAWAY DELAYED |
| RECYCLE OUTPUT VOLUMES | NO CONFLICT | NO CONFLICT | NO CONFLICT | NO CONFLICT | NO CONFLICT |
| TAPE COPY | NO TAKEAWAY | NO TAKEAWAY | NO TAKEAWAY | NO TAKEAWAY | NO TAKEAWAY |

The manner of use of the priority matrix 111 is discussed below in greater detail. The values of the priority matrix 111 may be set during an initialization operation during installation or configuration of the system 100, and/or subsequently reconfigured during system operation ("on the fly") by operator input via interface 109.

The takeaway registry 107 lists all pending takeaway requests for a particular tape. According to the illustrated option, a tape may be omitted from the takeaway registry if there are no pending takeaway requests. The takeaway registry 107 identifies tasks seeking takeaway by any suitable task name, host-ID, or other code. Tapes may be identified by VOLSER (as illustrated) or other appropriate indicia. TABLE 3 (below) shows an exemplary takeaway registry.

TABLE 3

TAKEAWAY REGISTRY

| TAPE SOUGHT FOR TAKEAWAY | TASK SEEKING TAKEAWAY |
|---|---|
| 113846R87157AG | process 108c |
| 11341RO123478 | process 108d |

The queue 113 comprises a first-in-first-out buffer containing tasks' requests to use a particular tape. The in-use registry lists tasks seeking takeaway by any suitable task name, host-ID, or other code. Tapes may be identified by VOLSER (as illustrated below) or other appropriate indicia. Optionally, the queue 113 may be sorted by priority, such as functional priority, time sequence, or other appropriate scheme. TABLE 4 (below) shows an exemplary queue 113.

TABLE 4

QUEUE

| TAPE | TASK(S) SEEKING USE OF THIS TAPE |
|---|---|
| 113846R87157AG | process 108c |
| 11341RO123478 | process 108d |
| 113846R87157AG | process 108d |

Exemplary Digital Data Processing Apparatus

As mentioned above, the computing hardware of the storage manager 108 may be implemented in various forms. As one example, the storage manager 108 may comprise a digital data processing apparatus, as exemplified by the hardware components and interconnections of the digital data processing apparatus 200 of FIG. 2.

Figure 2:
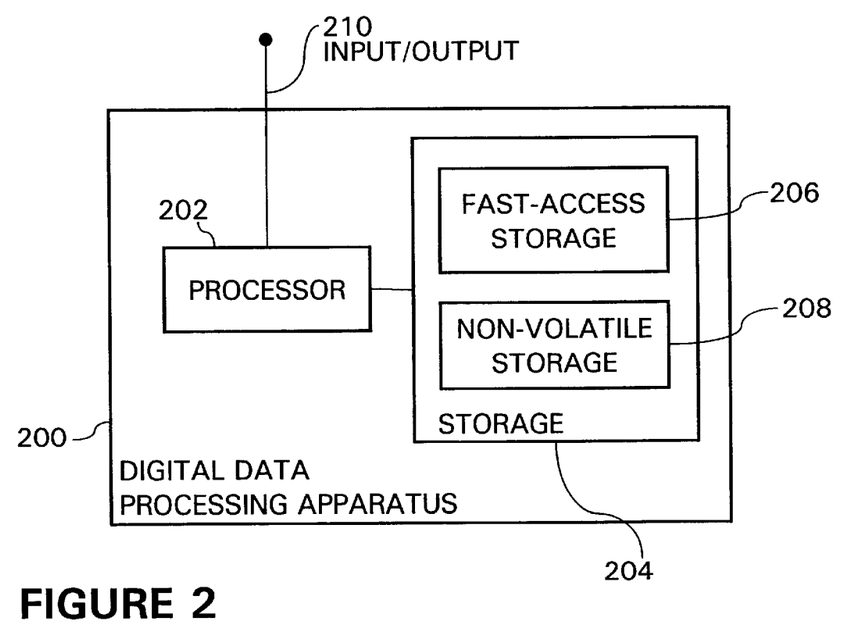
FIG. 2 is a block diagram of a digital data processing machine according to the invention.

The apparatus 200 includes a processor 202, such as a microprocessor or other processing machine, coupled to a storage 204. In the present example, the storage 204 includes a fast-access storage 206, as well as nonvolatile storage 208. The fast-access storage 206 may comprise random access memory ("RAM"), and may be used to store the programming instructions executed by the processor 202. The nonvolatile storage 208 may comprise, for example, one or more magnetic data storage disks such as a "hard drive", a tape drive, or any other suitable storage device. The apparatus 200 also includes an input/output 210, such as a line, bus, cable, electromagnetic link, or other means for the processor 202 to exchange data with other hardware external to the apparatus 200.

Despite the specific foregoing description, ordinarily skilled artisans (having the benefit of this disclosure) will recognize that the apparatus discussed above may be implemented in a machine of different construction, without departing from the scope of the invention. As a specific example, one of the components 206, 208 may be eliminated; furthermore, the storage 204 may be provided on-board the processor 202, or even provided externally to the apparatus 200.

Logic Circuitry

In contrast to the digital data processing apparatus discussed above, a different embodiment of the invention uses logic circuitry instead of computer-executed instructions to implement the storage manager 108. Depending upon the particular requirements of the application in the areas of speed, expense, tooling costs, and the like, this logic may be implemented by constructing an application-specific integrated circuit ("ASIC") having thousands of tiny integrated transistors. Such an ASIC may be implemented with CMOS, TTL, VLSI, or another suitable construction. Other alternatives include a digital signal processing chip ("DSP"), discrete circuitry (such as resistors, capacitors, diodes, inductors, and transistors), field programmable gate array ("FPGA"), programmable logic array ("PLA"), and the like.

Operation

Having described the structural features of the present invention, the method aspect of the present invention will now be described. Although the present invention has broad applicability to arbitrating conflicts for use of many types of computing resources, the specifics of the structure that has been described is particularly suited for removable serially-accessible data storage media such as magnetic tape, and the explanation that follows will emphasize such an implementation of the invention without any intended limitation.

Signal-Bearing Media

In the context of FIG. 1, such a method may be implemented, for example, by operating the storage manager 108, as embodied by a digital data processing apparatus 200, to execute various sequences of machine-readable instructions. These instructions may reside in various types of signal-bearing media. In this respect, one aspect of the present invention concerns a programmed product, comprising signal-bearing media tangibly embodying a program of machine-readable instructions executable by a digital data processor to arbitrate conflicts among different tasks for access to the same tape.

Figure 3:
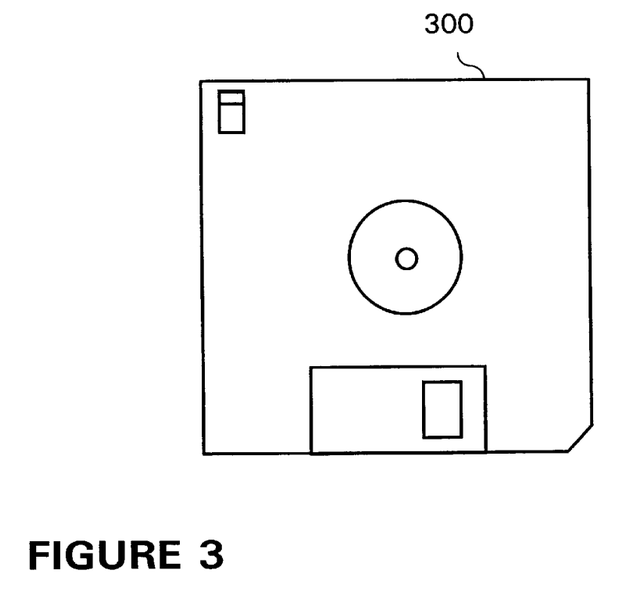
FIG. 3 shows an exemplary signal-bearing medium according to the invention.

This signal-bearing media may comprise, for example, RAM (not shown) contained within the storage manager 108, as represented by the storage 206. Alternatively, the instructions may be contained in another signal-bearing media, such as a magnetic data storage diskette 300 (FIG. 3), directly or indirectly accessible by the processor 202. Whether contained in the storage 206, diskette 300, or elsewhere, the instructions may be stored on a variety of machine-readable data storage media, such as direct access storage (e.g., a conventional "hard drive", redundant array of inexpensive disks ("RAID"), or another direct access storage device ("DASD")), magnetic tape, electronic read-only memory (e.g., ROM, EPROM, or EEPROM), optical storage (e.g., CD-ROM, WORM, DVD, digital optical tape), paper "punch" cards, or other suitable signal-bearing media including transmission media such as digital and analog and communication links and wireless. In an illustrative embodiment of the invention, the machine-readable instructions may comprise software object code, compiled from a language such as "C," etc.

Logic Circuitry

In contrast to the signal-bearing medium discussed above, the method aspect of the invention may be implemented using logic circuitry, without using a processor to execute instructions. In this embodiment, the logic circuitry is implemented in the storage manager 108, and is configured to perform operations to implement the method of the invention. The logic circuitry may be implemented using many different types of circuitry, as discussed above.

Use-Initiation Sequence

Figure 4:
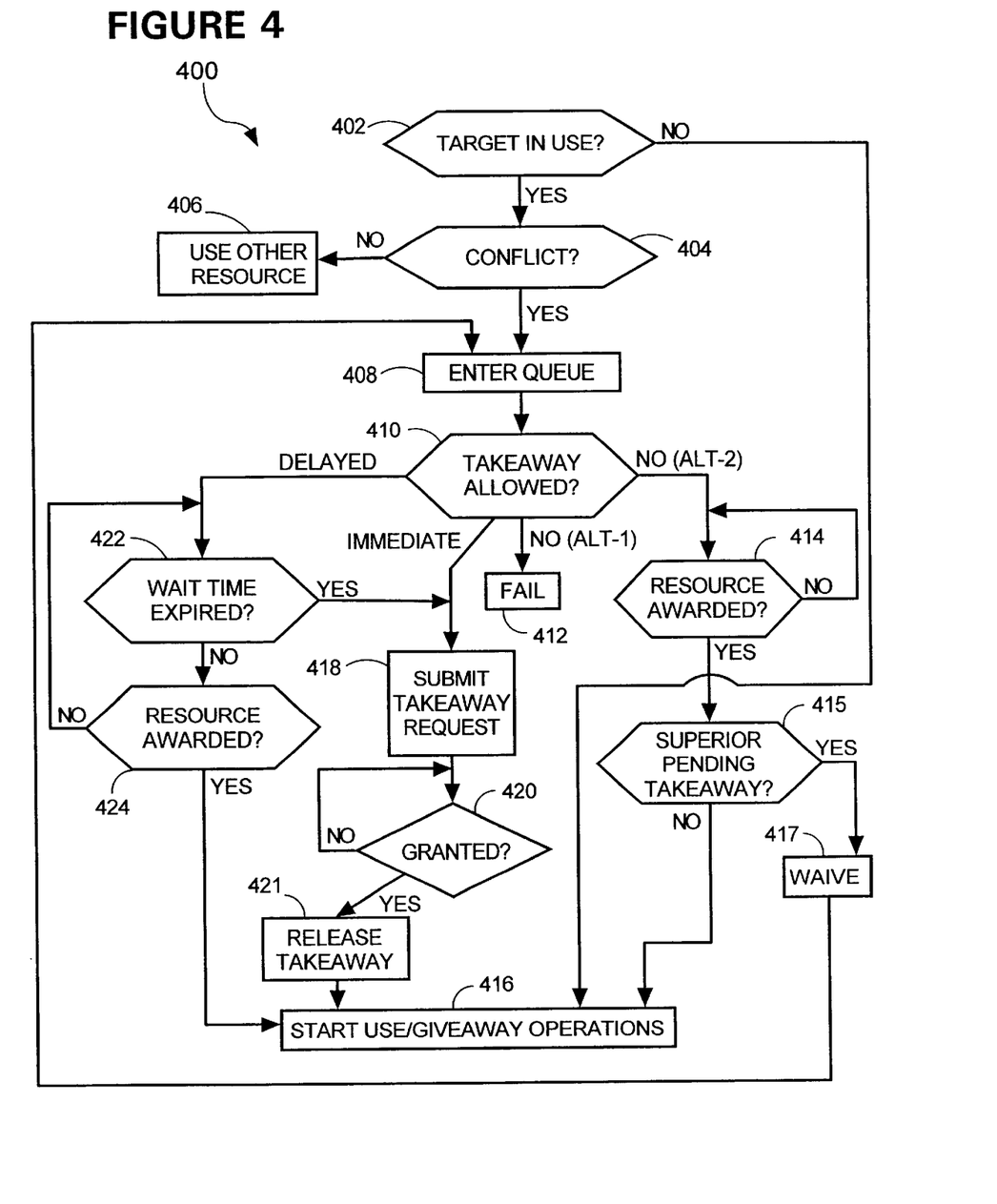
FIG. 4 is a flowchart of an operational sequence for use-initiation operations according to the invention.

FIG. 4 shows a sequence 400 to illustrate use-initiation operations according to the invention. In response to each task's request for access to a tape in the system 100, processing threads of the storage manager 108 (such as 108a–108d) perform the use-initiation operations. These operations are performed on behalf of the use-requesting task, whether this task constitutes one of the applications 103–105 or a process 108a–108d internal to the storage subsystem 102. For ease of explanation, without any intended limitation, the sequence 400 is described in the context of the tape storage system 100 described above.

The sequence 400 begins whenever the storage manager 108 receives an input/output request ("use-request") from a use-requesting task such as an internal processing thread 108a–108d of the storage manager 108 or one of the external applications 103–105. The use-request seeks Read and/or Write access to a specific "targeted" tape. As an example, the storage manager 108 may receive the use-request from a backup type program being executed by the storage manager 108 as one of the threads 108a–108d.

Figure 5:
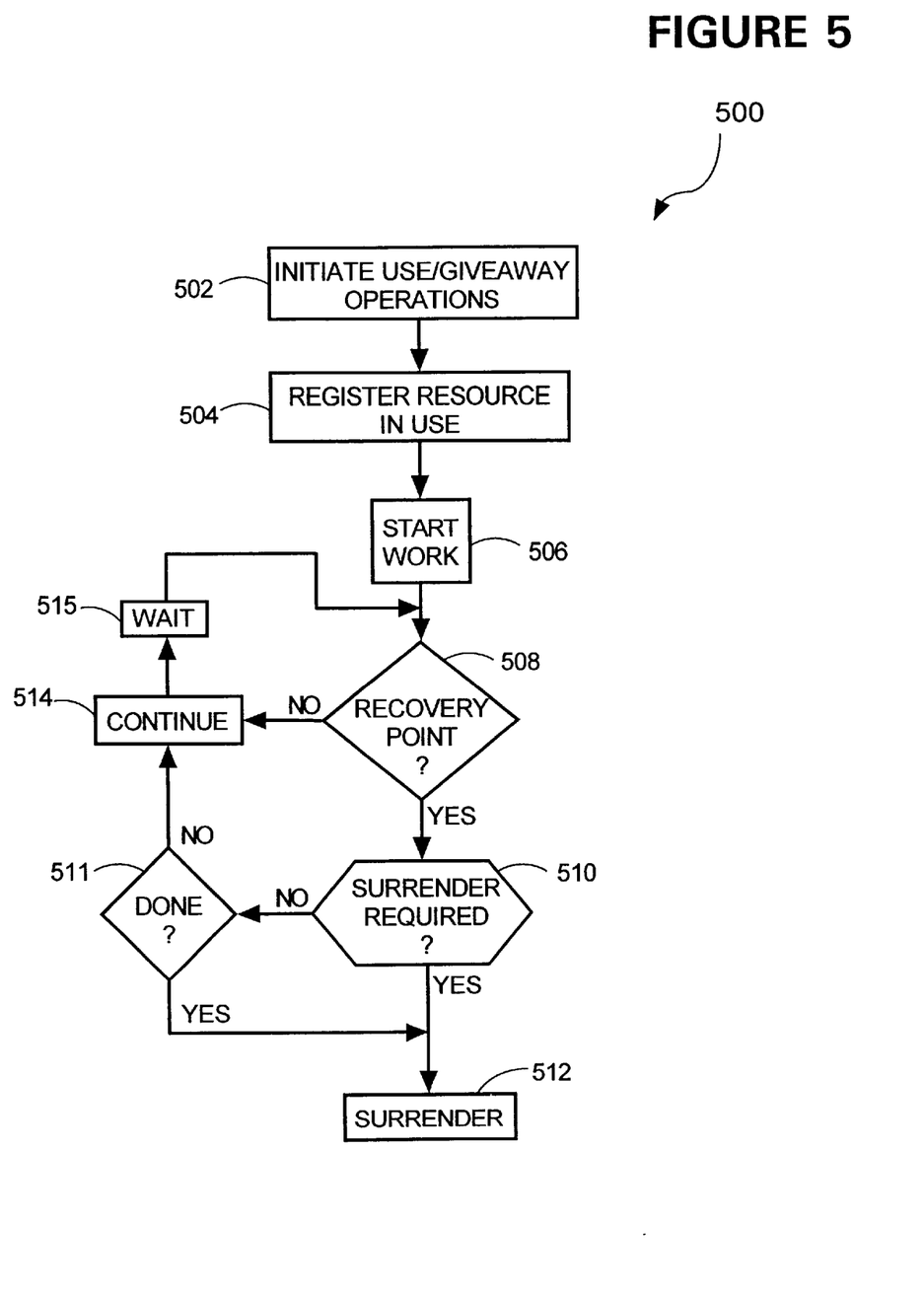
FIG. 5 is a flowchart of an operational sequence for use/giveaway operations according to the invention.

In response to receipt of the use-request, storage manager 108 (via one of the processing threads 108a–108d) performs step 402, which determines whether the targeted tape is already in-use by another task. This is performed by referencing the in-use registry 110 and determining whether it lists the targeted tape as being in-use by another task. If step 402 finds that the targeted tape is not already in-use, the storage manager 108 starts the process of acquiring and using the targeted tape (step 416). More specifically, in step 416 the storage manager starts "use/giveaway" operations, which are discussed in greater detail below with reference to the sequence 500 (FIG. 5). On the other hand, if the in-use registry 110 shows that the targeted tape is already in-use, then the storage manager 108 advances to step 404.

In step 404, the storage manager 108 asks whether the original use-request conflicts with the task that owns the tape. For example, some requests to write data (such as Backup) may be satisfied using any tape, not necessarily the targeted tape, so the use-request may be satisfied using another tape. Step 404 may be executed, for example, by the storage manager 108 cross-referencing the types of use-requesting and owning tasks in the priority matrix 111. Combinations that do not conflict are designated as "NO CONFLICT." If there is no conflict, then the storage manager 108 obtains another tape on behalf of the use-requesting application (step 406). If the use-requesting task does not appear in the priority matrix 111, then it is assumed that there is a conflict and step 404 proceeds to step 408 instead of step 406.

Similarly, step 408 is also performed if step 404 finds a conflict. In step 408 the storage manager 108 enters the use-requesting task into the queue 113. This places the use-requesting task in a first-in-first-out wait for the targeted tape to be released. After step 408, the storage manager 108 asks whether takeaway is allowed under the present circumstances (step 410). This is performed by cross-referencing the use-requesting task with the owning task in the priority matrix 111 to identify an appropriate conflict resolution. Step 410 branches depending upon which (if any) type of takeaway is permitted, according to the priority matrix 111. Namely, the priority matrix 111 lists the options of IMMEDIATE TAKEAWAY, DELAYED TAKEAWAY, and NO TAKEAWAY. If one or both of the use-requesting and owning tasks do not appear in the priority matrix 111, step 410 utilizes the option of NO TAKEAWAY.

If the result of step 410 is IMMEDIATE TAKEAWAY, step 410 advances to step 418. In step 418, the storage manager 108 makes an entry into the takeaway registry 107 on behalf of the use-requesting task. Namely, the storage manager 108 enters the identity of the targeted tape and the identity of the use-requesting task. After step 418, the storage manager 108 (i.e., the processing thread being executed by the storage manager 108 on behalf of the use-requesting task) waits until the takeaway is granted (step 420). Namely, this processing thread repeatedly polls the in-use registry 110 and the queue 113 until the in-use registry 110 is empty and the use-requesting task is next in the queue 113. The foregoing conditions indicate that the takeaway request is granted, and the takeaway requestor is entitled to use the requested tape. When this occurs, the storage manager deletes the use-requesting task's takeaway entry from the takeaway registry 107 (step 421). Then, in step 416, the storage manager 108 assists the use-requesting task in beginning to use the targeted tape via the use/giveaway operations 500 of FIG. 5 (discussed below).

In contrast to the preceding sequence, if the result of step 410 is DELAYED TAKEAWAY, the storage manager 108 institutes a delay before initiating takeaway. In the illustrated example, this is a fixed delay of predetermined length such as five seconds, however, other measures of delay may be used, such as delaying for the estimated time that it would take the owning task to complete its work, etc. The fixed delay embodiment is implemented by step 422, where the storage manager 108 asks whether a prescribed wait time has expired. If so, the storage manager 108 proceeds to submit a takeaway request on behalf of the use-requesting application (step 418). If not, the storage manager 108 proceeds to step 424 where it asks whether the task that owns the targeted tape has released the tape and the use-requesting task is "entitled" to use of the tape due to the natural advancement of the use-requesting task's queue entry that was made in step 408. Namely, step 424 asks whether the in-use registry 110 is empty and the use-requesting task is next in the queue 113. If the answer to step 424 is negative, the storage manager 424 returns to step 422. Otherwise, if step 424 finds that the use requesting task is entitled to use the tape, then the storage manager 108 initiates use step 416 (since takeaway was never requested). Namely, after step 424 (with a yes response) the storage manager 108 assists the use-requesting task in using the targeted tape in step 416, by starting the use/giveaway operations 500 of FIG. 5.

In contrast to the preceding operations, two alternatives may be implemented if the result of step 410 is NO TAKE-AWAY. Under one alternative (step 412), the storage manager 108 fails the use-requesting task's Read/Write request. This involves notifying the requestor of inability to obtain the requested tape and purging the request from the system. As another alternative, the storage manager 108 waits (step 414) until the task owning the targeted tape releases the tape and the use-requesting task becomes entitled to use the tape by advancement in the queue 113. At this point, the use-requesting task may be referred to as the "entitled task." More specifically, when the use-requesting task's entry into the queue 113 (previously made in step 408) eventually advances to the top of the queue 113, step 414 is satisfied, and the use-requesting process becomes entitled to use the targeted tape. At this time, step 414 advances to step 415, where the storage manager 108 determines whether a superior task has logged a pending takeaway request for the targeted tape. Step 415 is achieved by checking the takeaway registry 107 and determining whether the priority matrix 111 allows takeaway by the task having the next pending takeaway request (if any) in the registry 107. If there is a superior, pending takeaway request, then efficiency is gained by the entitled task yielding to the takeaway requester right away, rather than starting such use and having to relinquish use later due to the pending takeaway request. In this case, the storage manager 108 waives the entitled task's privilege to begin using the targeted tape (step 417). This occurs by the storage manager 108 removing the entitled task's entry from the queue 113, refraining from making any entry for the entitled task in the in-use registry 110, and then returning to step 408 to reenter the entitled task's identity into the queue 113.

Finally, when step 415 does not find a pending takeaway request, or there are pending takeaway requests but the task represented by the next takeaway request does not have priority over the entitled task, then step 415 advances to step 416 where the storage manager 108 assists the entitled task in starting to use the targeted tape.

Use/Giveaway Operations

FIG. 5 shows a sequence 500 to illustrate "use/giveaway" operations according to the invention. Process threads of the storage manager 108 begin the use/giveaway operations 500 on behalf of each task that becomes entitled to ownership of a tape, upon which the sequence 500 establishes ownership. After commencing a task's use of a tape, the sequence 500 occasionally determines whether the priority rules require relinquishment of the tape to another task seeking takeaway, and if so, the sequence 500 assists in relinquishing the tape. For ease of explanation, without any intended limitation, the sequence 500 is described in the context of the tape storage system 100 described above.

The sequence 500 begins in step 502, which is initiated under certain circumstances when a task becomes entitled to use a tape. Specifically, step 502 is triggered by the performance of step 416 (FIG. 4), discussed above. After step 502, the storage manager 108 registers the tape as being "in use" (step 504). This is accomplished by entering the entitled-task's identity in the in-use registry 110, and removing it from the queue 113 (unless there is no queue entry by virtue of step 402 proceeding straight to step 416). At this time, the storage manager 108 may also advise the entitled-task that it now owns the tape; this is achieved by transmitting a message to the applicable process 108*a*–108*d* or application 103–105. Alternatively, the entitled-task may learn of its ownership of the tape by polling the in-use registry 110.

After step 504, the entitled-task (now the "owning" task) begins to exercise ownership over its tape (step 506). This may entail Read and Write operations, or other operations particular to the particular type of system, such as "allocating" a tape. During the owning-task's use of its tape, at convenient times, the storage manager 108 (i.e., the process 108*a*–108*d* that is performing step 500) repeatedly considers any pending takeaway requests in case relinquishment of the tape becomes necessary. More particularly, in step 508 the storage manager 108 asks whether the owning-task has reached a predefined "recovery point." The recovery point (s) comprises one or more predefined times, events, or other occurrences where the owning-task can non-detrimentally pause work. In the context of data storage and backup, some exemplary recovery events include the completion of a minimal unit of backup work such as a data set, file, volume, allocation unit, etc.

If step 508 finds that a recovery point has not been reached, then the storage manager 108 continues its work in step 514, thereafter returning to step 508. A wait state 515 may be interposed between steps 514, 508 to ensure that the storage manager 108 checks for arrival of recovery points on a periodic schedule.

When a recovery point does occur, step 508 advances to step 510, where the storage manager 108 determines whether the owning task must relinquish its tape to the takeaway requester. Step 510 is performed by the storage manager 108 reading the next pending takeaway request for the current tape (if any) from the takeaway registry 107, and consulting the priority matrix to identify an appropriate conflict resolution solution. If the appropriate conflict resolution solution from the priority matrix 111 does not require the owning-task to relinquish the tape, then the storage manager 108 performs step 511. Step 511 asks whether the owning-task is finished with the work started in step 506. If not, the owning-task continues work in step 514. Otherwise, when step 511 finds that the owning-task is finished with the subject tape, step 511 advances to step 512. Step 512 is also performed if the storage manager 108 determines that the owning-task must surrender its tape due to a superior takeaway request (i.e., an affirmative answer from step 510). In either case, the owning process surrenders the tape in step 512, which ends the routine 500. Step 512 is performed by the storage manager 108 instructing the owning-task to terminate its use of the tape and also removing the owning-task's entry from the in-use registry 110. Optionally, the storage manager 108 may also affirmatively transmit a message to the next task waiting in the queue 113 for this tape, notifying the requestor that it is now entitled to use the tape. Ownership is not yielded directly to the takeaway requests; rather, the owning task deletes itself from the in-use registry 110, entitling the next task entered in the queue 113 to use the tape pursuant to steps 424, 420, or 414.

Forced Relinquishment of Failed Processes

Figure 6:
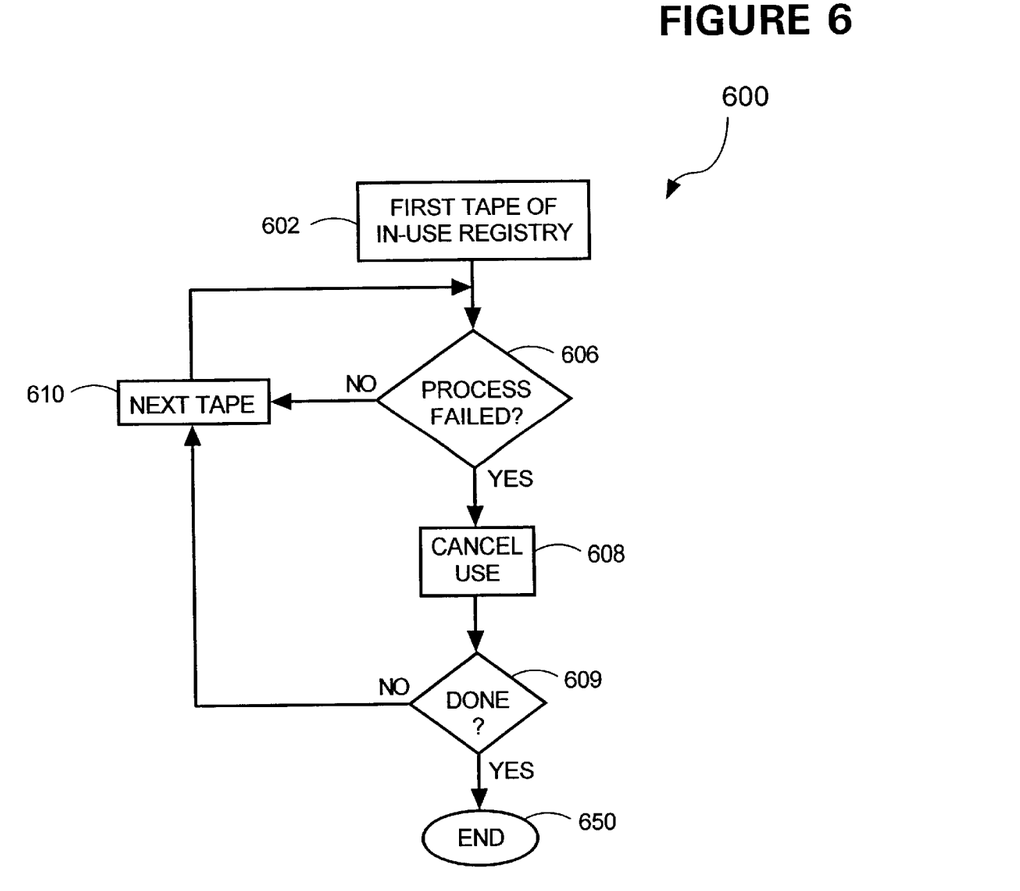
FIG. 6 is a flowchart of an operational sequence showing operations to force failed processes to relinquish shared computing resources, according to the invention.

FIG. 6 shows a sequence 600 to illustrate one implementation of forced relinquishment operations according to the invention. The sequence 600 may be implemented in various other ways as well, as discussed below. In the presently illustrated embodiment, one process 108a–108d of the storage manager 108 performs the sequence 600 in order to detect any tapes whose owning-tasks have failed, and force these failed tasks to relinquish ownership. For ease of explanation, without any intended limitation, the sequence 600 is described in the context of the tape storage system 100 described above.

Broadly, the sequence 600 reviews the tasks that currently own tapes, and forces any failed tasks to relinquish their tapes. The sequence 600 may be instituted periodically, randomly, responsive to events such as changes in the in-use registry, or any other useful schedule. The sequence 600 begins in step 602, where the storage manager 108 examines one of the tapes shown in the in-use registry 110. This tape is referred to as the "current" tape. Then, the storage manager 108 determines whether the owning-task of the current tape has failed (step 606). Process failure may be detected through various means, such as a signal from operating system that a task has failed, an error recovery routine of the failing task indicating failure, breakdown of an inter-task communication method, etc.

If the current tape's owning-task has failed, the storage manager 108 removes the owning-task's entry from the in-use registry 110 (step 608). In addition, step 608 may also forcibly terminate the failed process by various means, such as sending a signal to an operating system to terminate the process and asking the controller 112 to demount the tapes used by the failing task.

After step 608, the storage manager 108 performs step 609, where it determines whether all tapes of the in-use registry 110 have been considered by step 606. If more tapes remain, step 609 advances to step 610, where the storage manager 108 considers another tape listed in the in-use registry 610, making this the "current" tape. After step 610, the storage manager 108 performs step 606 for the new current tape. On the other hand, when step 609 finds that all tapes listed by the in-use registry 110 have been considered by step 606, the program 600 ends in step 650.

In the embodiment described above, the forced relinquishment process reviews all tapes of the in-use registry on a suitable schedule. In a different embodiment, the sequence 600 may be omitted, with owning tasks being,examined on a case-by-case basis. For example, the sequence 400 may be modified to perform steps 606/608 (analyze owning-task and cancel use if failed) at certain times. For example, the storage manager 108 may run a failure check if a task waits too long for takeaway to be granted (step 420) or if a task waits too long for another task to relinquish a tape (step 414).

OTHER EMBODIMENTS

While the foregoing disclosure shows a number of illustrative embodiments of the invention, it will be apparent to those skilled in the art that various changes and modifications can be made herein without departing from the scope of the invention as defined by the appended claims. Furthermore, although elements of the invention may be described or claimed in the singular, the plural is contemplated unless limitation to the singular is explicitly stated. Additionally, ordinarily skilled artisans will recognize that operational sequences must be set forth in some specific order for the purpose of explanation and claiming, but the present invention contemplates various changes beyond such specific order.

What is claimed is:

1. A method of operating a computing system to arbitrate access among multiple tasks to shared computing resource items, comprising operations of:

providing a priority matrix identifying different types of tasks, and prescribing different conflict resolution solutions for potential conflicts of various combinations of the different types of tasks for use of the resource items;

providing an in-use registry identifying the resource items being used and the tasks using such resources;

responsive to receiving each use-request from a task for access to a targeted resource item, performing use-initiation operations on behalf of the use-requesting task, comprising:

determining whether the targeted resource item is already in-use by another one of the tasks;

if the targeted resource item is already in-use, performing preexisting use operations comprising:

consulting the priority matrix to identify an appropriate conflict resolution solution applicable to the use-requesting task and the task presently using the targeted resource item;

only if the identified conflict resolution solution allows the use-requesting task to obtain use of the targeted resource item to the exclusion of the task presently using the targeted resource item, submitting a takeaway request and after the task presently using the targeted resource item relinquishes use then entering the use-requesting task into the in-use registry in association with the targeted resource item; and during use of each resource item by an owning task, performing giveaway operations on behalf of the owning task, comprising:

detecting arrival of prescribed recovery events;

responsive to arrival of each recovery event, determining whether any takeaway request is pending for the resource item; if any takeaway request is pending, consulting the priority matrix to identify an appropriate conflict resolution solution applicable to the owning task and the task that submitted the takeaway request;

if the identified conflict resolution solution requires the owning task to surrender the resource item, advising the owning task to relinquish use of the resource item and removing the owning task from the in-use registry.

2. The method of claim 1, the resource items comprising digital data storage media.

3. The method of claim 1, the use-initiation operations further comprising:

if the targeted resource item is not in-use, entering the use-requesting task into the in-use registry in association with the targeted resource item, and advising the use-requesting task to commence use of the targeted resource item.

4. The method of claim 1, the giveaway operations further comprising:
  if the identified conflict resolution solution does not require the owning task to surrender the resource item, advising the owning task to continue using the resource item.

5. The method of claim 1, where:
  the operation of providing the priority matrix prescribing conflict resolution solutions including IMMEDIATE TAKEAWAY and DELAYED TAKEAWAY;
  the operation of submitting a takeaway request is performed substantially immediately if the identified conflict resolution solution is IMMEDIATE TAKEAWAY;
  the operation of submitting a takeaway request is delayed by a predetermined time if the identified conflict resolution solution is DELAYED TAKEAWAY.

6. The method of claim 1, the preexisting use operations further comprising:
  if the identified conflict resolution solution prescribes NO CONFLICT, advising the use-requesting task to pursue use of a different resource item than the targeted resource item.

7. The method of claim 1, where:
  the operation of providing the priority matrix prescribing conflict resolution solutions including TAKEAWAY PROHIBITED;
  the preexisting use operations further include:
    if the specified resource item is in-use, entering the use-requesting task into a queue in association with the targeted resource item;
    if the identified conflict resolution solution is TAKEAWAY PROHIBITED, waiting for the entry of the use-requesting task to complete the queue and thereupon entering the use-requesting task into the in-use registry in association with the targeted resource item, removing the use-requesting task's entry from the queue, and advising the use-requesting task to commence use of the targeted resource item.

8. The method of claim 1, where the preexisting use operations further comprise:
  entering the use-requesting task into a queue in association with the targeted resource item;
  responsive to the entry completing the queue, entering the use-requesting task into the in-use registry in association with the targeted resource item, removing the use-requesting task's entry from the queue, and advising the use-requesting task to commence use of the targeted resource item.

9. The method of claim 8, where:
  the operations further comprise, for each resource item being used by an owning task, providing a takeaway registry identifying tasks that have submitted requests to takeaway the resource item from the owning task;
  the operation of submitting a takeaway request comprises entering the takeaway request into the takeaway registry;
  the operation of determining whether a submitted takeaway request is pending for the resource item being used comprises identifying a next takeaway request pending in the takeaway registry; and
  further responsive to an entry completing the queue, performing additional operations comprising:
    consulting the takeaway registry to determine whether any takeaway request is pending for the targeted resource item; if any takeawvay request is pending for the targeted resource item, consulting the priority matrix to identify an appropriate conflict resolution solution applicable to the task whose entry completed the queue and the task that submitted the takeaway request;
    only if the identified conflict resolution solution allows the task that submitted the pending takeaway request to obtain use of the targeted resource item to the exclusion of the task whose entry completed the queue, aborting the entry of the use-requesting task into the in-use registry;
    re-entering the use-requesting task into the queue in association with the targeted resource item.

10. The method of claim 1, where:
  the operations further comprise, for each resource item, providing a takeaway registry identifying tasks that have submitted requests to takeaway the resource item;
  the operation of submitting a takeaway request comprises entering the takeaway request into the takeaway registry;
  the operation of determining whether any takeaway request is pending for the resource item being used comprises identifying a next takeaway request pending in the takeaway registry.

11. The method of claim 10, where the preexisting use operations further comprise:
  entering the use-requesting task into a queue in association with the targeted resource item; and
  responsive to the use-requesting task's entry completing the queue, entering the use-requesting task into the in-use registry in association with the targeted resource item and removing the use-requesting task from the queue;
  responsive to the task presently using the targeted resource item relinquishing use:
    removing the use-requesting task from the queue; and
    removing the takeaway request from the takeaway registry.

12. The method of claim 1, the operations further comprising:
  for each resource item being used, examining the in-use registry to determine whether the owning task has failed, and responsive to such failure, deleting the owning task from the in-use registry and relinquishing use of the resource item to another task awaiting use of the resource item.

13. A signal-bearing medium tangibly embodying a program of machine-readable instructions executable by a digital processing apparatus to perform operations to arbitrate access among multiple tasks to shared computing resource items, the operations comprising:
  providing a priority matrix identifying different types of tasks, and prescribing different conflict resolution solutions for potential conflicts of various combinations of the different types of tasks for use of the resource items;
  providing an in-use registry identifying the resource items being used and the tasks using such resources;
  responsive to receiving each use-request from a task for access to a targeted resource item, performing use-initiation operations on behalf of the use-requesting task, comprising:

determining whether the targeted resource item is already in-use by another one of the tasks;

if the targeted resource item is already in-use, performing preexisting use operations comprising:

consulting the priority matrix to identify an appropriate conflict resolution solution applicable to the use-requesting task and the task presently using the targeted resource item;

only if the identified conflict resolution solution allows the use-requesting task to obtain use of the targeted resource item to the exclusion of the task presently using the targeted resource item, submitting a takeaway request and after the task presently using the targeted resource item relinquishes use then entering the use-requesting task into the in-use registry in association with the targeted resource item; and during use of each resource item by an owning task, performing giveaway operations on behalf of the owning task, comprising:

detecting arrival of prescribed recovery events;

responsive to arrival of each recovery event, determining whether any takeaway request is pending for the resource item; if any takeaway request is pending, consulting the priority matrix to identify an appropriate conflict resolution solution applicable to the owning task and the task that submitted the takeaway request;

if the identified conflict resolution solution requires the owning task to surrender the resource item, advising the owning task to relinquish use of the resource item and removing the owning task from the in-use registry.

14. The medium of claim 13, the resource items comprising digital data storage media.

15. The medium of claim 13, the use-initiation operations further comprising:

if the targeted resource item is not in-use, entering the use-requesting task into the in-use registry in association with the targeted resource item, and advising the use-requesting task to commence use of the targeted resource item.

16. The medium of claim 13, the giveaway operations further comprising:

if the identified conflict resolution solution does not require the owning task to surrender the resource item, advising the owning task to continue using the resource item.

17. The medium of claim 13, where:

the operation of providing the priority matrix prescribing conflict resolution solutions including IMMEDIATE TAKEAWAY and DELAYED TAKEAWAY;

the operation of submitting a takeaway request is performed substantially immediately if the identified conflict resolution solution is IMMEDIATE TAKEAWAY;

the operation of submitting a takeaway request is delayed by a predetermined time if the identified conflict resolution solution is DELAYED TAKEAWAY.

18. The medium of claim 13, the preexisting use operations further comprising:

if the identified conflict resolution solution prescribes NO CONFLICT, advising the use-requesting task to pursue use of a different resource item than the targeted resource item.

19. The medium of claim 13, where:

the operation of providing the priority matrix prescribing conflict resolution solutions including TAKEAWAY PROHIBITED;

the preexisting use operations further include:

if the specified resource item is in-use, entering the use-requesting task into a queue in association with the targeted resource item;

if the identified conflict resolution solution is TAKEAWAY PROHIBITED, waiting for the entry of the use-requesting task to complete the queue and thereupon entering the use-requesting task into the in-use registry in association with the targeted resource item, removing the use-requesting task's entry from the queue, and advising the use-requesting task to commence use of the targeted resource item.

20. The medium of claim 13, where the preexisting use operations further comprise:

entering the use-requesting task into a queue in association with the targeted resource item;

responsive to the entry completing the queue, entering the use-requesting task into the in-use registry in association with the targeted resource item, removing the use-requesting task's entry from the queue, and advising the use-requesting task to commence use of the targeted resource item.

21. The medium of claim 13, where:

the operations further comprise, for each resource item being used by an owning task, providing a takeaway registry identifying tasks that have submitted requests to takeaway the resource item from the owning task;

the operation of submitting a takeaway request comprises entering the takeaway request into the takeaway registry;

the operation of determining whether a submitted takeaway request is pending for the resource item being used comprises identifying a next takeaway request pending in the takeaway registry; and further responsive to an entry completing the queue, performing additional operations comprising:

consulting the takeaway registry to determine whether any takeaway request is pending for the targeted resource item; if any takeaway request is pending for the targeted resource item, consulting the priority matrix to identify an appropriate conflict resolution solution applicable to the task whose entry completed the queue and the task that submitted the pending takeaway request;

only if the identified conflict resolution solution allows the task that submitted the pending takeaway request to obtain use of the targeted resource item to the exclusion of the task whose entry completed the queue, aborting the entry of the use-requesting task into the in-use registry;

re-entering the use-requesting task into the queue in association with the targeted resource item.

22. The medium of claim 13, where:

the operations further comprise, for each resource item, providing a takeaway registry identifying tasks that have submitted requests to takeaway the resource item;

the operation of submitting the takeaway request comprises entering the takeaway request into the takeaway registry;

the operation of determining whether a takeaway request is pending for the resource item being used comprises identifying a next takeaway request pending in the takeaway registry.

23. The medium of claim 13, where the preexisting use operations further comprise:
- entering the use-requesting task into a queue in association with the targeted resource item; and
- responsive to the use-requesting task's entry completing the queue, entering the use-requesting task into the in-use registry in association with the targeted resource item and removing the use-requesting task from the queue;
- responsive to the task presently using the targeted resource item relinquishing use:
  - removing the use-requesting task from the queue; and
  - removing the takeaway request from the takeaway registry.

24. The medium of claim 13, the operations further comprising:
- For each resource item being used, examining the in-use registry to determine whether the owning task has failed, and responsive to such failure, deleting the owning task from the in-use registry and relinquishing use of the resource item to another task awaiting use of the resource item.

25. A logic circuit of multiple interconnected electrically conductive elements configured to perform operations to arbitrate access among multiple tasks to shared computing resource items, the operations comprising:
- providing a priority matrix identifying different types of tasks, and prescribing different conflict resolution solutions for potential conflicts of various combinations of the different types of tasks for use of the resource items;
- providing an in-use registry identifying the resource items being used and the tasks using such resources;
- responsive to receiving each use-request from a task for access to a targeted resource item, performing use-initiation operations on behalf of the use-requesting task, comprising:
  - determining whether the targeted resource item is already in-use by another one of the tasks;
  - if the targeted resource item is already in-use, performing preexisting use operations comprising:
    - consulting the priority matrix to identify an appropriate conflict resolution solution applicable to the use-requesting task and the task presently using the targeted resource item;
    - only if the identified conflict resolution solution allows the use-requesting task to obtain use of the targeted resource item to the exclusion of the task presently using the targeted resource item, submitting a takeaway request and after the task presently using the targeted resource item relinquishes use then entering the use-requesting task into the in-use registry in association with the targeted resource item; and
- during use of each resource item by an owning task, performing giveaway operations on behalf of the owning task, comprising:
  - detecting arrival of prescribed recovery events;
  - responsive to arrival of each recovery event, determining whether any takeaway request is pending for the resource item; if any takeaway request is pending, consulting the priority matrix to identify an appropriate conflict resolution solution applicable to the owning task and the task that submitted the takeaway request;
  - if the identified conflict resolution solution requires the owning task to surrender the resource item, advising the owning task to relinquish use of the resource item and removing the owning task from the in-use registry.

26. A computing system, comprising:
- multiple computing resource items;
- a priority matrix identifying different types of tasks and prescribing different conflict resolution solutions for potential conflicts of various combinations of the different types of tasks for use of the resource items;
- in-use registry identifying the resource items being used and the tasks using such resources;
- a resource arbitrator configured to perform operations to arbitrate access among multiple tasks to the computing resource items, the operations comprising:
  - responsive to receiving each use-request from a task for access to a targeted resource item, performing use-initiation operations on behalf of the use-requesting task, comprising:
    - determining whether the targeted resource item is already in-use by another one of the tasks;
    - if the targeted resource item is already in-use, performing preexisting use operations comprising:
      - consulting the priority matrix to identify an appropriate conflict resolution solution applicable to the use-requesting task and the task presently using the targeted resource item;
      - only if the identified conflict resolution solution allows the use-requesting task to obtain use of the targeted resource item to the exclusion of the task presently using the targeted resource item, submitting a takeaway request and after the task presently using the targeted resource item relinquishes use then entering the use-requesting task into the in-use registry in association with the targeted resource item; and
  - during use of each resource item by an owning task, performing giveaway operations on behalf of the owning task, comprising:
    - detecting arrival of prescribed recovery events;
    - responsive to arrival of each recovery event, determining whether any takeaway request is pending for the resource item; if any takeaway request is pending, consulting the priority matrix to identify an appropriate conflict resolution solution applicable to the owning task and the task that submitted the takeaway request;
    - if the identified conflict resolution solution requires the owning task to surrender the resource item, advising the owning task to relinquish use of the resource item and removing the owning task from the in-use registry.

27. The computing system of claim 26, where:
the computing system further includes a queue;
where the preexisting use operations further comprise:
- entering the use-requesting task into the queue in association with the targeted resource item;
- responsive to the entry completing the queue, entering the use-requesting task into the in-use registry in association with the targeted resource item, removing the use-requesting task's entry from the queue, and advising the use-requesting task to commence use of the targeted resource item.

28. The computing system of claim 26, where:
the computing system further includes a takeaway registry identifying tasks that have submitted requests to takeaway any of the resource items;

the operation of submitting a takeaway request comprises entering the takeaway request into the takeaway registry;

the operation of determining whether a takeaway request is pending for the resource item being used comprises identifying a next takeaway request pending in the takeaway registry.

29. A data storage system, comprising:

one or more data storage read/write drives;

multiple removable data storage media removably mountable to the read/write drives;

a priority matrix identifying different types of tasks and prescribing different conflict resolution solutions for potential conflicts of various combinations of the different types of tasks for use of the storage media;

an in-use registry identifying the storage media being used and the tasks using such resources;

a resource arbitrator configured to perform operations to arbitrate access among multiple tasks to the computing storage media, the operations comprising:

responsive to receiving each use-request from a task for access to a targeted storage medium, performing use-initiation operations on behalf of the use-requesting task, comprising:

determining whether the targeted storage medium is already in-use by another one of the tasks;

if the targeted storage medium is already in-use, performing preexisting use operations comprising:

consulting the priority matrix to identify an appropriate conflict resolution solution applicable to the use-requesting task and the task presently using the targeted storage medium;

only if the identified conflict resolution solution allows the use-requesting task to obtain use of the targeted storage medium to the exclusion of the task presently using the targeted storage medium, submitting a takeaway request and after the task presently using the targeted resource item relinquishes use and then entering the use-requesting task into the in-use registry in association with the targeted storage medium;

during use of each storage medium by an owning task, performing giveaway operations on behalf of the owning task, comprising:

detecting arrival of prescribed recovery events;

responsive to arrival of each recovery event, determining whether any takeaway request is pending for the resource item; if any takeaway request is pending, consulting the priority matrix to identify an appropriate conflict resolution solution applicable to the owning task and the task that submitted the takeaway request;

if the identified conflict resolution solution requires the owning task to surrender the storage medium, advising the owning task to relinquish use of the storage medium and removing the owning task from the in-use registry.

30. A computing system, comprising:

multiple computing resource items;

priority matrix means for identifying different types of tasks and prescribing different conflict resolution solutions for potential conflicts of various combinations of the different types of tasks for use of the resource items;

in-use registry means for identifying the resource items being used and the tasks using such resources;

resource arbitrating means for arbitrating access among multiple tasks to the computing resource items by:

responsive to receiving each use-request from a task for access to a targeted resource item, performing use-initiation operations on behalf of the use-requesting task, comprising:

determining whether the targeted resource item is already in-use by another one of the tasks;

if the targeted resource item is already in-use, performing preexisting use operations comprising:

consulting the priority matrix means to identify an appropriate conflict resolution solution applicable to the use-requesting task and the task presently using the targeted resource item;

only if the identified conflict resolution solution allows the use-requesting task to obtain use of the targeted resource item to the exclusion of the task presently using the targeted resource item, submitting a takeaway request and after the task presently using the targeted resource item relinquishes use then entering the use-requesting task into the in-use registry in association with the targeted resource item; and during use of each resource item by an owning task, performing giveaway operations on behalf of the owning task, comprising:

detecting arrival of prescribed recovery events;

responsive to arrival of each recovery event, determining whether any takeaway request is pending for the resource item; if any takeaway request is pending, consulting the priority matrix to identify an appropriate conflict resolution solution applicable to the owning task and the task that submitted the takeaway request;

if the identified conflict resolution solution requires the owning task to surrender the resource item, advising the owning task to relinquish use of the resource item and removing the owning task from the in-use registry.

* * * * *